United States Patent [19]

Iizuka

[11] Patent Number: 5,113,722
[45] Date of Patent: May 19, 1992

[54] TIMING CONTROL DURING DOWNSHIFT TO ENGINE BRAKING RANGE

[75] Inventor: Naonori Iizuka, Shizuoka, Japan
[73] Assignee: Jatco Corporation, Fuji, Japan
[21] Appl. No.: 719,049
[22] Filed: Jun. 21, 1991
[30] Foreign Application Priority Data Jun. 22, 1990 [JP] Japan .................................. 2-164937

[51] Int. Cl.⁵ ............................................. F16H 61/08
[52] U.S. Cl. .................................................. 74/866
[58] Field of Search ......................................... 74/866

[56] References Cited

U.S. PATENT DOCUMENTS

| | | | |
|---|---|---|---|
| 4,680,992 | 7/1987 | Hayasaki et al. | 74/869 |
| 4,730,521 | 3/1988 | Hayasaki et al. | 74/867 |
| 4,742,732 | 5/1988 | Hiramatsa | 74/866 |
| 4,753,134 | 6/1988 | Hayasaki | 74/866 |
| 4,787,258 | 11/1988 | Yamamoto et al. | 74/866 |
| 5,012,698 | 5/1991 | Hayasaki | 74/866 |
| 5,022,286 | 6/1991 | Takizawa | 74/866 |
| 5,033,330 | 7/1991 | Okahara | 74/866 X |
| 5,038,636 | 8/1991 | Vukovich et al. | 74/866 |

FOREIGN PATENT DOCUMENTS 2-33963 3/1990 Japan .

OTHER PUBLICATIONS

Service Manual (publication No. A261C07) entitled "Nissan Full Range Electronically Controlled Automatic Transmission RE4R01A Type", published by Nissan Motor Company Limited in Mar. 1987.

Primary Examiner—Dirk Wright
Attorney, Agent, or Firm—Marks & Murase

[57] ABSTRACT

A timing control for an overrunning clutch is disclosed. A revolution speed ratio of an input shaft revolution speed to an output shaft revolution speed is employed as a parameter reflecting the progress in a downshift initiated by a select operation to an engine braking range. When this ratio reaches a target value, a control unit generates an ON signal. In response to this ON signal, an overrunning clutch solenoid is energized to engage the overrunning clutch.

6 Claims, 5 Drawing Sheets

FIG. 2

| | C18 | C20 | C22 | C24 | B28 | B26 | OWC 30 | OWC 29 | GEAR RATIO | α1 = 0.440  α2 = 0.493 |
|---|---|---|---|---|---|---|---|---|---|---|
| D RANGE 1ST. SPEED | | | ○ | | | | ○ | ○ | $\dfrac{1+\alpha_2}{\alpha_2}$ | 3.027 |
| 2ND. SPEED | | | ○ | | ○ | | ○ | | $\dfrac{\alpha_1+\alpha_2+\alpha_1\alpha_2}{\alpha_2(1+\alpha_1)}$ | 1.619 |
| 3RD. SPEED | | ○ | ○ | ○ | | | ○ | | 1 | 1.000 |
| 4TH. SPEED | | | (○) | ○ | ○ | | | | $\dfrac{1}{1+\alpha_1}$ | 0.694 |
| ENGINE BRAKE RUNNING STATE 1ST. SPEED | | | (○) | | | ○ | (○) | (○) | | |
| 2ND. SPEED | | | (○) | ○ | ○ | | (○) | | | |
| 3RD. SPEED | | ○ | (○) | ○ | ○ | | (○) | | | |
| 4TH. SPEED | | ○ | (○) | | ○ | | | | | |
| REVERSE | ○ | | | | | ○ | | | $-\dfrac{1}{\alpha_1}$ | -2.272 |

( ) UNRELATED TO POWER TRANSMISSION

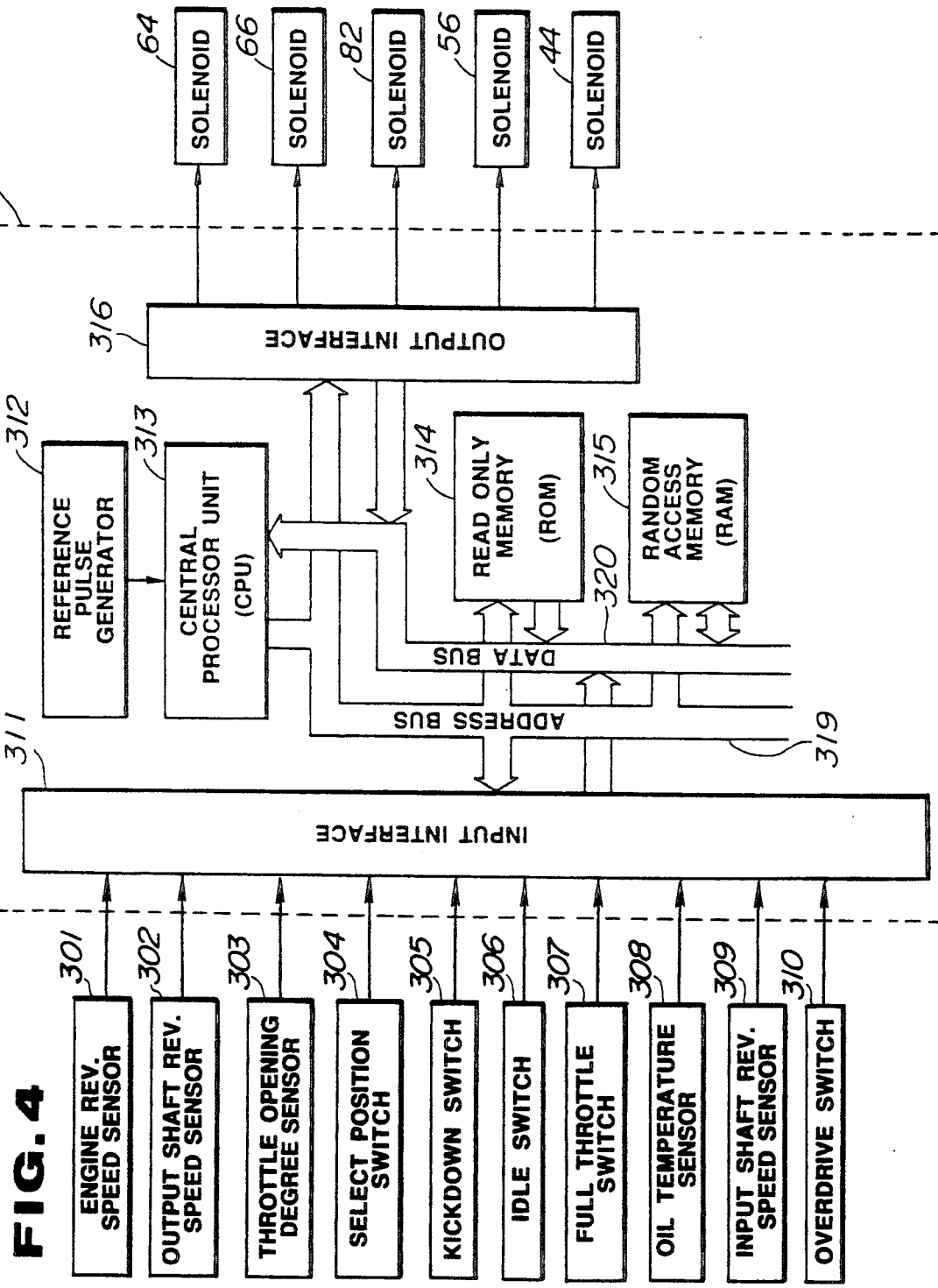

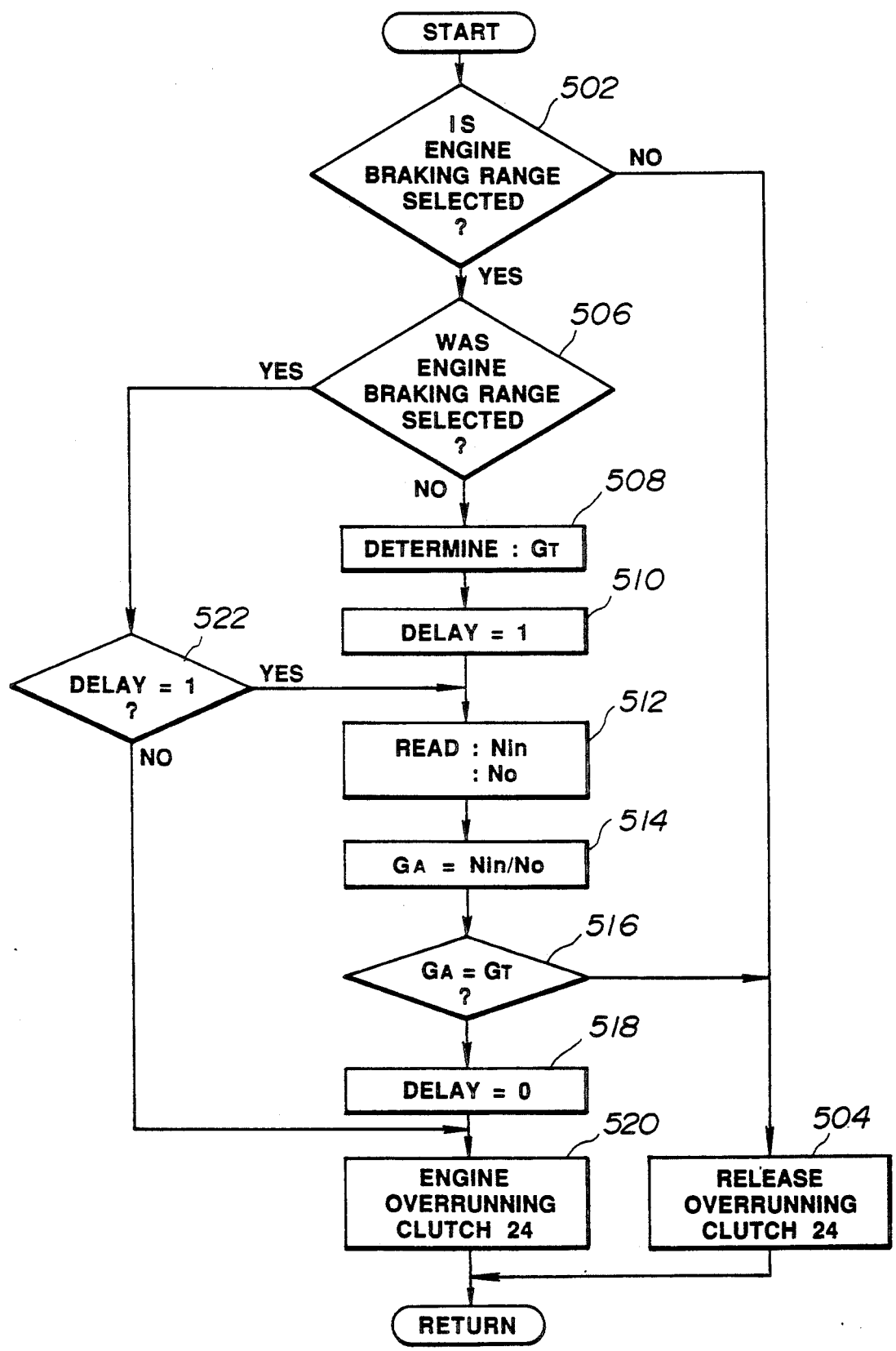

TIMING CONTROL DURING DOWNSHIFT TO ENGINE BRAKING RANGE

BACKGROUND OF THE INVENTION

The present invention relates to an automatic transmission, and more particularly to a timing control during a downshift initiated by a select operation to an engine braking range.

Japanese Utility Model Application First (unexamined) Publication No. 2-33963 discloses a timing control for an overrunning clutch that is to be engaged when an automatic transmission is conditioned in an engine brake running state. According to this known timing control, the overrunning clutch is engaged upon elapse of a predetermined period of time after a select operation to an engine braking range. This predetermined period is variable by varying the running condition an automotive vehicle which the automatic transmission is installed in.

An object of the present invention is to improve a timing control of the above kind such that the engagement timing of the overrunning clutch is adaptively varied by varying an actual progress of a downshift initiated by the select operation to the engine braking range.

SUMMARY OF THE INVENTION

According to one aspect of the present invention, there is provided a system for a timing control for an automatic transmission including an input shaft, a output shaft, an one-way clutch which becomes ineffective in transmitting reverse torque from the output shaft to the input shaft, and an overrunning clutch which, when engaged, becomes effective in transmitting reverse torque from the output shaft to the input shaft. The automatic transmission is shiftable to an engine brake running state when the overrunning clutch is engaged in response to a select operation to an engine braking range. The system comprising:

means for detecting an input revolution speed of the input shaft and generating an input shaft revolution speed indicative signal indicative of said input revolution speed detected;

means for detecting an output revolution speed of the output shaft and generating an output shaft revolution speed indicative signal indicative of said output revolution speed detected;

means for detecting whether the engine braking range is selected or not and generating an engine braking range indicative signal when the engine braking range is selected;

a control unit receiving said input shaft revolution speed indicative signal, said output shaft revolution speed indicative signal and said engine braking range indicative signal, said control unit including, means for deriving a predetermined relationship between said input shaft revolution speed indicative signal and said output shaft revolution speed indicative signal;

means for checking whether said engine braking range position indicative signal is generated or not and determining occurrence of the select operation to the engine braking range;

means for setting a target value;

means for determining whether said predetermined relationship reaches said target value or not after the occurrence of the select operation has been determined;

means for generating an output signal when said predetermined relationship reaches said target value; and means for engaging the overrunning clutch in response to said output signal.

According to another aspect of the present invention, there is provided a method of a timing control for an automatic transmission including an input shaft, a output shaft, an one-way clutch which becomes ineffective in transmitting reverse torque from the output shaft to the input shaft, and an overrunning clutch which when engaged becomes effective in transmitting reverse torque, from the output shaft to the input shaft. The automatic transmission is shiftable to an engine brake running state when the overrunning clutch is engaged in response to a select operation to an engine braking range. The method comprising the steps of:

detecting an input revolution speed of the input shaft and generating an input shaft revolution speed indicative signal indicative of said input revolution speed detected;

detecting an output revolution speed of the output shaft and generating an output shaft revolution speed indicative signal indicative of said output revolution speed detected;

detecting whether the engine braking range is selected or not and generating an engine braking range indicative signal when the engine braking range is selected;

deriving a predetermined relationship between said input shaft revolution speed indicative signal and said output shaft revolution speed indicative signal;

checking whether said engine braking range position indicative signal is generated or not and determining occurrence of the select operation to the engine braking range;

setting a target value;

determining whether said predetermined relationship reaches said target value or not after the occurrence of the select operation has been determined;

generating an output signal when said predetermined relationship reaches said target value; and engaging the overrunning clutch in response to said output signal.

BRIEF DESCRIPTION OF THE DRAWINGS

FIG. 2 is a table illustrating which frictionally engageable couplings are actuated in each of speeds;

FIG. 4 is a block diagram of an automatic transmission control unit; and

FIG. 5 a flow diagram for explaining the sequence of necessary operating steps.

DETAILED DESCRIPTION OF THE INVENTION

Figure 1:
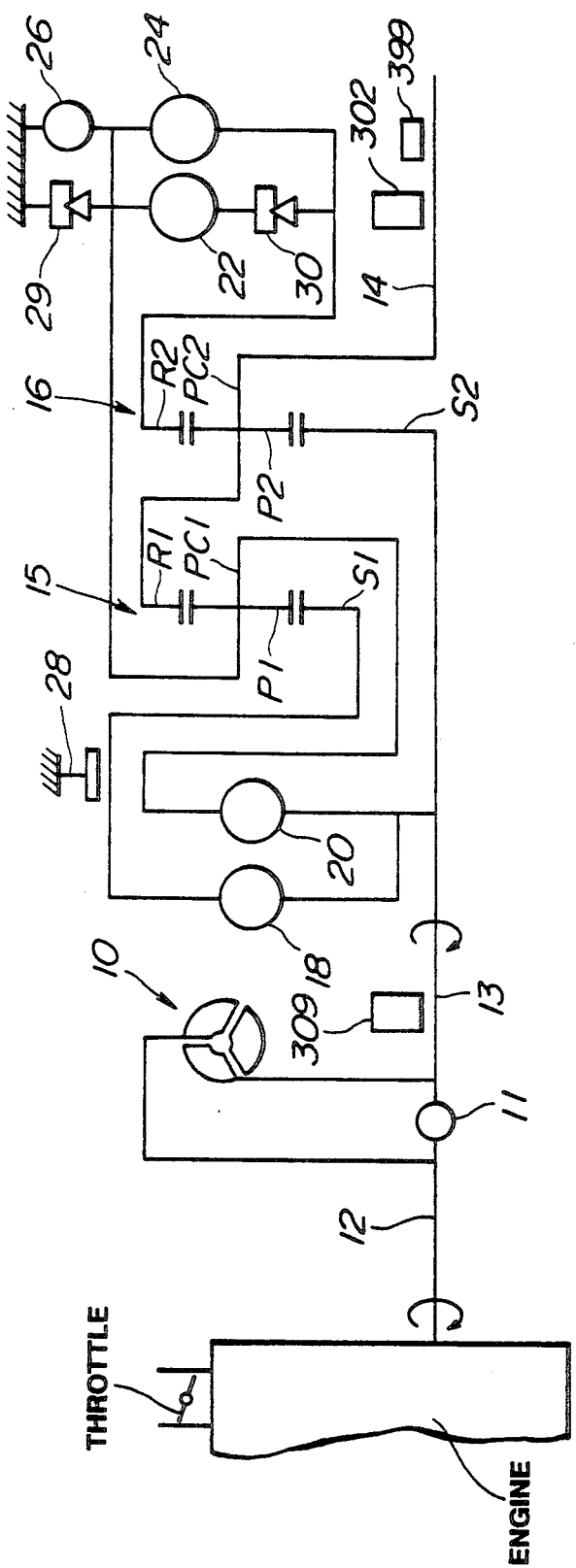
FIG. 1 is a schematic diagram of an automatic stepwise operable transmission coupled with an engine of an automotive vehicle.

Referring to FIG. 1, an automatic stepwise operable transmission is drivingly coupled with a torque converter 10 which is in turn drivingly coupled with an output shaft 12 of an engine of an automotive vehicle. The engine has a throttle valve which opens in degrees.

The automatic transmission provides four forward speeds with an overdrive and a single reverse. The transmission includes an input o shaft 13 connected to a turbine runner of the torque converter 10, and an output shaft 14 connected to a final drive gear assembly, not illustrated. It also includes a first planetary gear set 15, a second planetary gear set 16, a reverse clutch 18, a high clutch 20, a forward clutch 22, an overrunning clutch 24, a low & reverse brake 26, a band brake 28, a low one-way clutch 29, and a forward one-way clutch 30. The torque converter 10 includes therein a lock-up clutch 11. The first planetary gear set 15 comprises a sun gear S1, a ring gear R1, and a pinion carrier PC1 rotatably supporting pinion gears P1, each meshing both the sun and ring gears S1 and R1. The planetary gear set 16 comprises a sun gear S2, a ring gear R2, and a pinion carrier PC2 rotatably supporting pinion gears P2, each meshing both the sun and ring gears S2 and R2. The carrier PC1 is connectable to the input shaft 13 via the high clutch 20, while the sun gear S1 is connectable to the input shaft 13 via the reverse clutch 18. The carrier PC1 is connectable to the ring gear R2 via the forward clutch 22 and the forward one-way clutch 30 arranged in series with the forward clutch 22 or via the overrunning clutch 24 arranged in parallel to both the forward clutch 22 and forward one-way clutch 30. The sun gear S2 is connected to the input shaft 13, while the ring gear R1 and the carrier PC2 are constantly connected to the output shaft 14. The low & reverse brake 26 is arranged to hold the carrier PC1 stationary, while the band brake 28 is arranged to hold the sun gear S1 stationary. The low one-way clutch 29 is arranged to allow a rotation of the pinion carrier PC1 in a forward direction (the same direction as a direction which the engine shaft 12 rotates in), but preventing a rotation in the opposite reverse direction.

In this transmission, rotating states of various rotary elements (S1, S2, R1, R2, PC1, and PC2) of planetary gear sets 15 and 16 are varied by actuating the hydraulically actuable and frictionally engageable couplings, namely, the clutches 18, 20, 22, 24, and brakes 26, 28, in different combinations thereby to vary a ratio, i.e., a gear ratio, of a revolution speed of the input shaft 13 to a revolution speed of the output shaft 14. Four forward speeds and a single reverse speed are provided by actuating the clutches 18, 20, 22, and 24, and the brakes 26 and 28 in various combinations as shown in FIG. 2. In FIG. 2, the sign ○ (circle) denotes that a particular coupling is actuated or engaged, the signs α 1 (alpha one) and α 2 (alpha two) designate a ratio of number of teeth of the ring gear R1 to that of the sun gear S1 and a ratio of number of teeth of the ring gear R2 to that of the sun gear S2.

Figure 3:
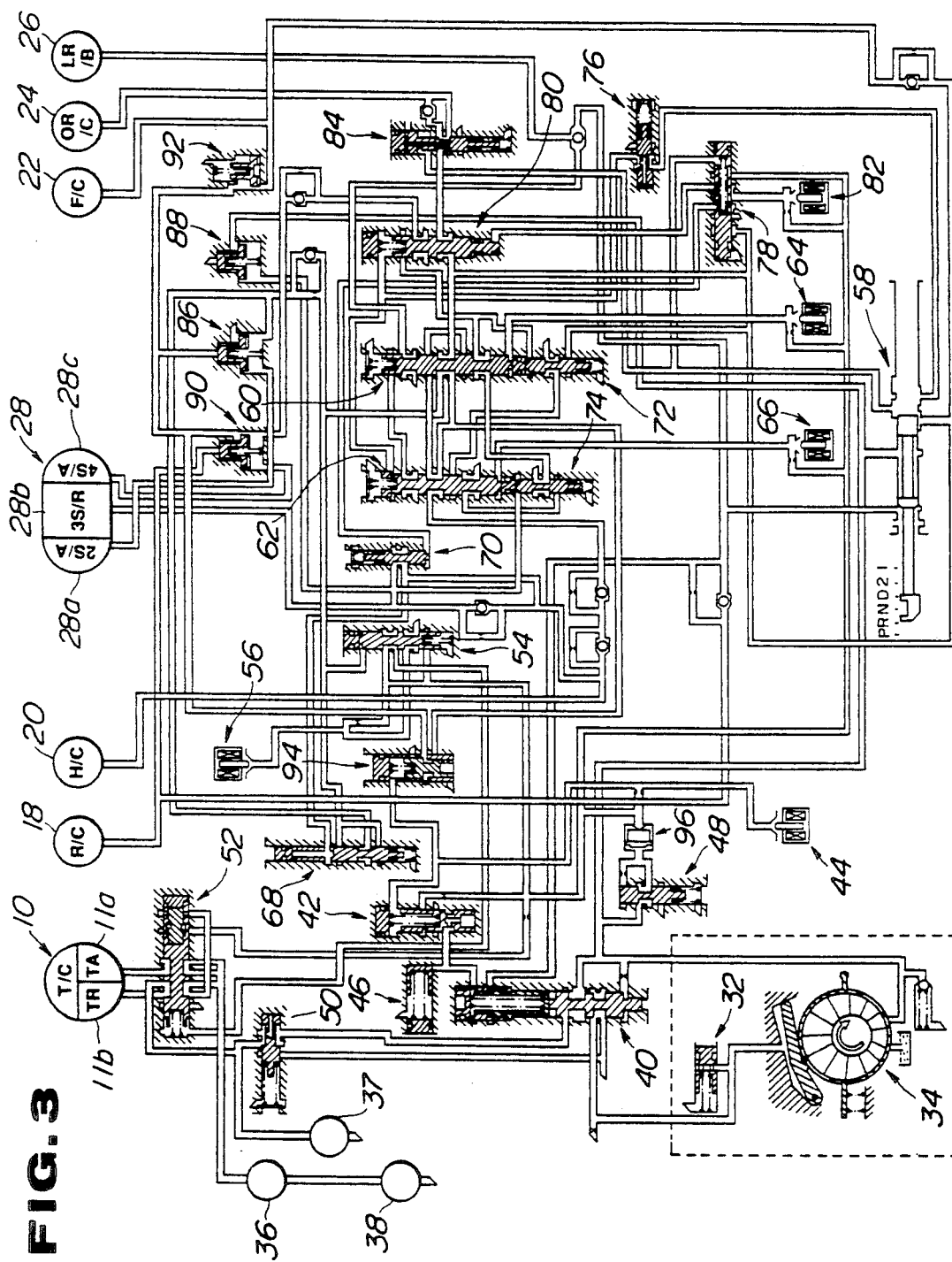
FIG. 3 is a circuit diagram of a hydraulic control system of the automatic transmission.

FIG. 3 shows a hydraulic control system of the transmission. This hydraulic control system comprises a pressure regulator valve 40, a pressure modifier valve 42, a line pressure solenoid 44, a modifier pressure accumulator 46, a pilot valve 48, a torque converter relief valve 50, a lock-up control valve 52, a first shuttle valve 54, a lock-up solenoid 56, a manual valve 58, a first shift valve 60, a second shift valve 62, a first shift solenoid 64, a second shift solenoid 66, a servo charger valve 68, a 3-2 timing valve 70, a 4-2 relay valve 72, a 4-2 sequence valve 74, a first reducing valve 76, a second shuttle valve 78, an overrunning clutch control valve 80, an overrunning clutch solenoid 82, an overrunning clutch reducing valve 84, a 1-2 accumulator 86, a 2-3 accumulator 88, a 3-4 accumulator 90, a N-D accumulator 92, an accumulator control valve 94, and a filter 96. These components are interconnected as illustrated. As illustrated, they are also connected to the before-mentioned torque converter. The torque converter 10 includes an apply chamber 11a and a release chamber 11b for the lock-up clutch 11. These components are also connected to forward clutch 22, the high clutch 20, the band brake 28, which includes a second speed apply chamber 28a, a third speed release chamber 28b, and a fourth speed apply chamber 28c, the reverse clutch 18, the low reverse brake 26, and the overrunning clutch 24. They are connected also to the variable capacity vane type oil pump 34, the oil cooler 36, the forward lubrication circuit 37, and the rear lubrication circuit 38 as illustrated. The detailed description of these valves is hereby omitted. The automatic transmission thus far briefly described is substantially the same as an automatic transmission of RE4R01A type which is manufactured by Nissan Motor Company Limited in Japan. The automatic transmission of the RE4R01A type is described in a service manual publication No. A261C07 entitled "NISSAN FULL RANGE ELECTRONICALLY CONTROLLED AUTOMATIC TRANSMISSION RE4R01A TYPE" published by Nissan Motor Company Limited in March, 1987. U.S. Pat. No. 4,730,521 issued to Hayasaki et al. in Mar. 15, 1989 discloses the automatic transmission of the RE4R01A type. Thus, reference is made to the above-mentioned service manual and the U.S. Pat. No. 4,730,521 for full understanding of the automatic transmission of this type.

Referring to FIGS. 1 and 2, in this automatic transmission, the forward one-way clutch 30 is provided to improve a shift shock during a downshift, i.e., a 4-3 downshift, see FIG. 2, in D range. This forward one-way clutch 30 is effective in transmitting engine torque to the driving wheels, but o ineffective in transmitting reverse torque from the driving wheels to the engine. Thus, if engine braking is desired, the manual valve 58 is manipulated to move from D range to a so-called engine braking range, like 2 range or 1 range. This causes a downshift from the fourth speed in D range to the second speed in engine braking running state or from the third speed in D range to the second speed in engine brake running state, see FIG. 2. During such downshift, the overrunning clutch 24 is engaged.

Referring to FIG. 3, the overrunning clutch 24 is controllable by the overrunning clutch solenoid 82 such that it is engaged when the solenoid 82 is energized (ON) and released or disengaged when the solenoid 82 is deenergized (OFF). Briefly explaining the overrunning clutch solenoid control, the overrunning clutch solenoid 82 is controlled in an ON/OFF manner in response to the output of the control unit 300, see FIG. 4. The overrunning clutch solenoid 82 is energized by the control unit 300. Fluidly disposed between the overrunning clutch solenoid 82 and overrunning clutch 24 are the shuttle valve 78, overrunning clutch control valve 80 and overrunning clutch reducing valve 84. The pilot valve 40 generates a constant pilot pressure which is delivered to the shuttle valve 78. This pilot pressure is supplied to a drain passage whose drain port is closed when the overrunning clutch solenoid 82 is energized and opened when the latter is deenergized. The shuttle valve 78 is connected to the 3-2 timing 70. The manner of controlling the overrunning clutch solenoid 82 is described on pages I-30 to I-34 of the above-mentioned service manual. Reference is made to U.S. Pat. No.

4,680,992 issued to Hayasaki et al on Jul. 21, 1987 or an understanding an engine braking control and 3-2 timing control using the overrunning clutch solenoid.

FIG. 4 shows the control unit 300 which controls the solenoids 44, 56, 64, 66 and 82. The control unit 300 comprises an input interface 311, a reference pulse generator 312, a CPU (a central processor unit) 313, a ROM (a read only memory) 314, a RAM (a random access memory) 315, and an output interface 316. They are interconnected by an address bus 319, and a data bus 320. Fed to this control unit 300 are output signals of an engine revolution speed sensor 301, an output shaft revolution speed sensor (a vehicle speed sensor) 302, a throttle opening degree sensor 303, a select position switch 304, a kickdown switch 305, an idle switch 306, a full throttle switch 307, an oil temperature sensor 308, an input shaft revolution speed sensor (a turbine revolution speed sensor) 309, and an overdrive switch 310. The output shaft revolution o speed sensor 302 detects a revolution speed of the output shaft 14. The input shaft revolution speed sensor 309 detects a revolution speed of the input shaft 13. The outputs of the control unit 300 are supplied to the shift solenoids 64 and 66, overrunning clutch solenoid 82, lock-up solenoid 56, and line pressure solenoid 44.

The manner of the progress of a downshift from the fourth speed in D range to the second speed in 2 range is explained. This downshift is initiated by manually shifting the manual valve 58 from D range to 2 range. For effecting this 4-2 downshift without establishment of the third speed, the 4-2 relay valve 72 and 4-2 sequence valve 74 are provided. Upon occurrence of a command for 4-2 downshift, the 4-2 sequence valve memorizes that the fourth speed is established and cooperates with the 4-2 sequence valve 74 and shift solenoid 64 and 66 to prevent 4-3-2 downshift, while the 4-2 sequence valve prevents discharge of hydraulic fluid from the fourth speed servo apply chamber 28C until, discharge of hydraulic fluid from the high clutch 20 and the third speed servo apply chamber 28b is completed. Thus, the band brake 28 is kept engaged during the 4-2 downshift. The overrunning clutch 24 is engaged at a timing determined by the control unit 300. This is explained along with an overrunning clutch timing control routine shown in FIG. 5.

In FIG. 5, there is an interrogation 502 as to whether a reading operation of an output signal of the select position switch 304 performed in the present run of this routine indicates that any one of engine braking ranges, namely 2 range and 1 range, is selected. If this is not the case (negative), the routine proceeds to a step 504 where an OFF signal for deenergising the overrunning clutch solenoid 82 for releasing the overrunning clutch 24 is outputted. If this is the case (affirmative), there is another interrogation 506 inquiries whether a reading operation of the output signal of the select position switch 304 performed in the preceding run indicates that any one of the engine braking ranges is selected. If this is the case (affirmative), the routine proceeds to an interrogation 225 and inquiries whether a delay flag DELAY is set. If the interrogation 506 results in negative, this is the case where the engine braking range was selected immediately prior to the present run of the routine. Then, in a step 508, a target revolution speed ratio $G_T$ is determined after retrieving empirically determined data. The arrangement of the data is such that with a higher vehicle speed, a larger value will result, with a larger throttle opening degree, and a larger value. Since different timings need to be set for, different types of shifts, different values of $G_T$ are set for different kinds of shifts. After the step 508, the flag DELAY is set to equal 1 in a step 510. Then, in a step 512, reading operations of the output signals of the input shaft revolution speed sensor 309 and the vehicle speed sensor 302 occur for storing the results as an input shaft revolution speed Nin and an output shaft revolution speed $N_O$, respectively. In a step 514, using the stored data Nin and No, an actual revolution speed ratio $G_A$ as expressed by an equation $G_A = Nin/No$ is calculated. Following step 514, there is an interrogation 516 as to whether $G_A$ is equal to $G_T$. If this is not the case (negative), the routine proceeds to the step 504, leaving the overrunning clutch 24 disengaged. In the succeeding run, if the interrogation 516 results in affirmative, the routine proceeds to a step 518 and the flag DELAY is reset and at a step 520 an ON signal for energizing the overrunning clutch solenoid 82 to engage the overrunning clutch 24 is outputted. Referring to the interrogation 522, the routine proceeds to the step 512 if this is the case. Thus, as long as the flag DELAY is equal to 1, a flow along 512, 514, 516 and 504 is repeated. In a run immediately after the flag DELAY has been reset at step 518, the routine proceeds from the interrogation 522 to the step 520, keeping the overrunning clutch 124 engaged.

From the previous description in connection with FIG. 5, it is readily seen that the progress of the downshift initiated by a manual select from the D range to the engine braking range is monitored by repeatedly checking the predetermined relationship between the data Nin and No. Since this relationship correctly reflects the actual progress of the downshift, the overrunning clutch 24 is engaged always in a predetermined optimal timed relationship within a predetermined state of progress in the downshift. As a result, the predetermined relationship between the downshift due to the selection of the engine braking range and the engagement of the overrunning clutch 24 is continuously maintained regardless of variation of speed of progress in the downshift. Thus, a shockless and quick downshift to engine braking range is always assured regardless of any variation in environment.

In the previously described embodiment, $G_A$ (= Nin/No) is used as a parameter reflecting the progress of the downshift, a difference D between Nin and No may also be used as such a parameter.

What is claimed is:

1. A system for a timing control for an automatic transmission including an input shaft, an output shaft, a one-way clutch which becomes ineffective in transmitting reverse torque from the output shaft to the input shaft, and an overrunning clutch which when engaged becomes effective in transmitting reverse torque from the output shaft to the input shaft, the automatic transmission being shiftable to an engine brake running state when the overrunning clutch is engaged in response to a select operation to an engine braking range, the system comprising:

means for detecting an input revolution speed of the input shaft and generating an input shaft revolution speed indicative signal indicative of said input revolution speed detected;

means for detecting an output revolution speed of the output shaft and generating an output shaft revolution speed indicative signal indicative of said output revolution speed detected;

means for detecting whether the engine braking range is selected or not and generating an engine braking range indicative signal when the engine braking range is selected;

a control unit receiving said input shaft revolution speed indicative signal, said output shaft revolution speed indicative signal and said engine braking range indicative signal, said control unit including, means for deriving a predetermined relationship between said input shaft revolution speed indicative signal and said output shaft revolution speed indicative signal;

means for checking whether said engine braking range position indicative signal is generated or not and determining occurrence of the select operation to the engine braking range;

means for setting a target value;

means for determining whether said predetermined relationship reaches said target value or not after the occurrence of the select operation has been determined;

means for generating an output signal when said predetermined relationship reaches said target value; and means for engaging the overrunning clutch in response to said output signal.

2. A system as claimed in claim 1, wherein said target value is variable.

3. A system as claimed in claim 1, wherein said predetermined relationship is a ratio of said input shaft revolution speed indicative signal to said output shaft revolution speed indicative signal.

4. A method of a timing control for an automatic transmission including an input shaft, an output shaft, a one-way clutch which becomes ineffective in transmitting reverse torque from the output shaft to the input shaft, and an overrunning clutch which when engaged becomes effective in transmitting reverse torque from the output shaft to the input shaft, the automatic transmission, being shiftable to an engine brake running state when the overrunning clutch is engaged in response to a select operation to an engine braking range, the method comprising the steps of:

detecting an input revolution speed of the input shaft and generating an input shaft revolution speed indicative signal indicative of said input revolution speed detected;

detecting an output revolution speed of the output shaft and generating an output shaft revolution speed indicative signal indicative of said output revolution speed detected;

detecting whether the engine braking range is selected or not and generating an engine braking range indicative signal when the engine braking range is selected;

deriving a predetermined relationship between said input shaft revolution speed indicative signal and said output shaft revolution speed indicative signal;

checking whether said engine braking range position indicative signal is generated or not and determining occurrence of the select operation to the engine braking range;

setting a target value;

determining whether said predetermined relationship reaches said target value or not after the occurrence of the select operation has been determined;

generating an output signal when said predetermined relationship reaches said target value; and engaging the overrunning clutch in response to said output signal.

5. A method as claimed in claim 4, wherein said predetermined relationship is a ratio of said input shaft revolution speed indicative signal to said output shaft revolution speed indicative signal.

6. A method as claimed in claim 4, wherein said predetermined relationship is a difference between said input shaft revolution speed indicative signal and said output shaft revolution speed indicative signal.

* * * * *